(12) United States Patent
Vergouw et al.

(10) Patent No.: US 7,744,311 B2
(45) Date of Patent: Jun. 29, 2010

(54) LIGHT-WEIGHT VERSATILE J-LAY SYSTEM

(75) Inventors: Theodorus Christianus Maria Vergouw, Schoonhoven (NL); Mark van Heumen, Zwijndrecht (NL)

(73) Assignee: Gusto Engineering B.V., Schiedam (NL)

( * ) Notice: Subject to any disclaimer, the term of this patent is extended or adjusted under 35 U.S.C. 154(b) by 759 days.

(21) Appl. No.: 10/592,101

(22) PCT Filed: Mar. 10, 2005

(86) PCT No.: PCT/NL2005/000179

§ 371 (c)(1),
(2), (4) Date: Sep. 6, 2006

(87) PCT Pub. No.: WO2005/085692

PCT Pub. Date: Sep. 15, 2005

(65) Prior Publication Data

US 2007/0189857 A1    Aug. 16, 2007

(30) Foreign Application Priority Data

Mar. 10, 2004    (EP) .................................. 04075776

(51) Int. Cl.
F16L 1/15 (2006.01)
(52) U.S. Cl. ...................................... 405/170; 405/167
(58) Field of Classification Search ................. 405/166, 405/167, 168.1, 169, 170
See application file for complete search history.

(56) References Cited

U.S. PATENT DOCUMENTS

| | | | | |
|---|---|---|---|---|
| 3,440,826 A * | 4/1969 | Kline | .......................... | 405/166 |
| 4,068,490 A * | 1/1978 | Jegousse | ..................... | 405/166 |
| 4,433,938 A * | 2/1984 | Boon | .......................... | 405/166 |
| 6,293,732 B1 * | 9/2001 | Baugh | ......................... | 405/170 |
| 6,334,739 B1 * | 1/2002 | Baugh | ......................... | 405/166 |
| 6,364,573 B1 * | 4/2002 | Baugh | ......................... | 405/166 |
| 6,554,538 B2 * | 4/2003 | Stockstill | ................. | 405/168.3 |
| 6,702,519 B2 * | 3/2004 | Stockstill | ................. | 405/168.3 |
| 6,733,208 B2 * | 5/2004 | Stockstill | ..................... | 405/169 |
| 6,761,506 B2 * | 7/2004 | De Lang et al. | .......... | 405/168.3 |
| 2002/0021943 A1 * | 2/2002 | Frijns | ......................... | 405/170 |
| 2002/0159839 A1 * | 10/2002 | Frijns et al. | .................. | 405/166 |
| 2003/0044235 A1 * | 3/2003 | Stockstill | ................. | 405/154.1 |
| 2003/0091395 A1 * | 5/2003 | Stockstill | ................. | 405/154.1 |
| 2003/0118409 A1 * | 6/2003 | Lang et al. | ............... | 405/168.1 |
| 2005/0019100 A1 * | 1/2005 | Simpson | ..................... | 405/166 |

* cited by examiner

Primary Examiner—Tara Mayo-Pinnock
(74) Attorney, Agent, or Firm—Abelman, Frayne & Schwab

(57) ABSTRACT

A vessel has a substantially vertical frame attached to a vessel support structure, an upper clamping element vertically displaceable along the frame via a displacement member, a lower clamping element aligned with the upper clamping element, a loading device for supplying a pipe segment to the upper clamping element, and a control device adapted to control the displacement member and the upper and lower clamping elements for lowering the pipe segment by the displacement member along a pipe trajectory, with the upper clamping element being engaged on the pipe segment, while the lower clamping element is disengaged, with the lower clamping element being situated on the vessel support structure, with a transverse track extending from a side position on the vessel to a position alongside the pipe trajectory, and a support member which is displaceable along the track to be situated in the pipe trajectory.

18 Claims, 7 Drawing Sheets

LIGHT-WEIGHT VERSATILE J-LAY SYSTEM

CROSS-REFERENCE TO RELATED APPLICATIONS

This application is a 371 of international application number PCT/NL2005/000179, filed on Mar. 10, 2005.

BACKGROUND OF THE INVENTION

The invention relates to a vessel comprising a substantially vertical frame attached to a vessel support structure, an upper clamping element, vertically displaceable along the frame via a displacement member, a lower clamping element, aligned with the upper clamping element, a loading device for supplying a pipe segment to the upper clamping element, control means adapted to control the displacement member and the upper and lower clamping elements for lowering the pipe segment by the displacement member along a pipe trajectory, the upper clamping element being engaged on the pipe segment, while the lower clamping element is disengaged.

J-lay towers are known in which pipe segments are lowered from the J-lay tower according to the hand-over-hand principle by intermittently holding the sea-pipe by a travelling clamp and by a fixed clamp. The known J-lay towers are often relatively heavy and not suitable to easily retrofit existing vessels with J-lay equipment.

BRIEF SUMMARY OF THE INVENTION

It is an object of the present invention to provide a pipe-lay device which is relatively light weight, and which can be easily retrofitted to the stern or moon pool of existing vessels. The system of the present invention should allow deep-water pipe-laying in a cost-effective manner, using relatively small installation vessels.

It is a further object of the present invention to provide a pipe-lay device which has a relatively low vertical centre of gravity.

It is again an object of the present invention to provide a vessel in which a welding station can be applied which does not need an angular position adjustment when the frame inclination is adapted.

It is still an object of the present invention in which a travelling clamping member can be displaced downwardly having a relatively long stroke.

It is a further object to provide a vessel by which other objects than pipes can be placed in the pipe trajectory and/or can be lowered to or lifted from the sea bed.

It is also an object of the present invention to provide a J-lay vessel which has a light-weight and easy to use abandonment and retrieval system.

Hereto the vessel according to the present invention is characterised by the lower clamping element being situated on the vessel support structure, a transverse track extending from a side position on the vessel to a position alongside the pipe trajectory, and a support member which is displaceable along the track to be situated in the pipe trajectory.

Because the lower clamping member is not part of the J-lay frame, but is supported on the vessel support structure, the weight of the J-lay tower itself is reduced. This allows easy mounting of the light-weight frame parts requiring a reduced lifting capacity and reduces the modifications and structural reinforcements required of the vessel to accommodate the system. Integration of the lower clamping block on the vessel support structure provides a low vertical centre of gravity, reducing the motion-induced support loads on the vessel and providing for increased stability. The same applies for the support member, the weight of which is also carried by the vessel support structure rather than the frame, resulting in reduced frame loads.

In one embodiment, the lower clamping element is situated closer to the sea bed than the support member, providing for a low vertical centre of gravity. The support member can be skidded out of the pipe trajectory such that the travelling clamping member can pass the vertical position of the support member during the lay stroke, achieving a relatively large pipe lay stroke.

In another embodiment the frame is connected to the vessel via a hinge axis, drive means being provided for adjusting the angle of the frame by hinging around the axis, independently from the support member. Upon adjusting the tower angle, the support member remains horizontal on the vessel and need not be adjusted.

In one embodiment, the support member comprises a generally U-shaped welding table for attaching two pipe segments ends of a first pipe segment hanging from the upper clamping element and a second pipe segment hanging from the lower clamping element, having two legs on each side of the pipe trajectory, and an upper positioning device on the welding table, having at least two clamping blocks for engaging with a pipe, the positioning device being attached to the welding table via at least two force transmitters for causing a displacement of the clamping blocks relative to the welding table.

Because the welding table is supported by the track on the vessel, the total frame weight is reduced. Furthermore, by the independent support of the welding table, the welding table remains horizontal upon tilting of tower (the tower angle is adjusted, dependent on the water depth of pipe-laying). This simplifies the design of the welding table. Furthermore, by allowing the welding table to be skidded out of the pipe trajectory, or firing line, the travelling clamp can pass the vertical position of the welding table during the lay stroke and other equipment can be moved into the firing line along the track.

The clamping blocks on the welding table serve to align the pipe segments prior to being welded together. The joints of the pipe segments to be connected do not have perfect bevels. The joints can be oval or the bevel may not be perpendicular to the joint axis. By integrating a bending tool in the welding table, a bending assembly is formed together with the upper, travelling clamping member, resulting in a line-up tool which adds relatively little mass to the tower while allowing accurate alignment of the pipe segments.

The welding table may be removable from the pipe trajectory, for instance along the track, a second support element being displaceable along the track for receiving a structural element in a receiving position remote from the pipe trajectory, and for placing the structural element in the pipe trajectory.

A time consuming activity of pipe-laying projects is formed by inserting of inline sleds, Pipeline End Manifolds (PLEM's), valve blocks etc. Handling involved in inserting and positioning of these typically heavy and bulky objects is usually complicated. According to the invention this problem is solved by using the second support member on the track as a transporter for carrying equipment from a loading position to the pipe trajectory. An inboard crane is used for lifting the welding table of the track and placing the transporter on the track, as well as for positioning equipment on the transporter in the loading position. After moving the equipment, for instance a PLEM, into the pipeline trajectory by the second support member, the welding table is used to weld the PLEM into place. Next, the arms of the U-shaped welding table can be moved apart, and the welding table is placed out of the way of the pipe trajectory, such that the PLEM and the sea pipe can be lowered. In addition, the second support member can be used as an overhead crane for the fixed, lower clamping member area.

The light weight pipe-lay structure of the present invention may comprise a storage device storing a length of cable, the cable comprising at spaced distances gripping members for engaging with the clamping elements, the cable being guided from the storage device to a guide roller on the frame, and from the guide roller downwardly along the pipe trajectory, a lifting member being attached to the end of the cable.

In this manner, the hand-over-hand lowering frame of the pipe-lay equipment can be used as a lowering or lifting device for abandonment and retrieval (A&R) of the pipeline, or as lowering and lifting device for other equipment. Preferably the cable is formed of synthetic, substantially neutral buoyant material comprising equally spaced steel connectors which interact with the clamping members. A preferred embodiment of such a lowering and lifting cable is described in WO 03/062112 in the name of the applicant, which is incorporated herein by reference.

BRIEF DESCRIPTION OF THE SEVERAL VIEWS OF THE DRAWING

Some embodiments of the vessel according to the present invention will be explained in detail with reference to the accompanying drawings. In the drawings.

DETAILED DESCRIPTION OF THE INVENTION

Figure 1:
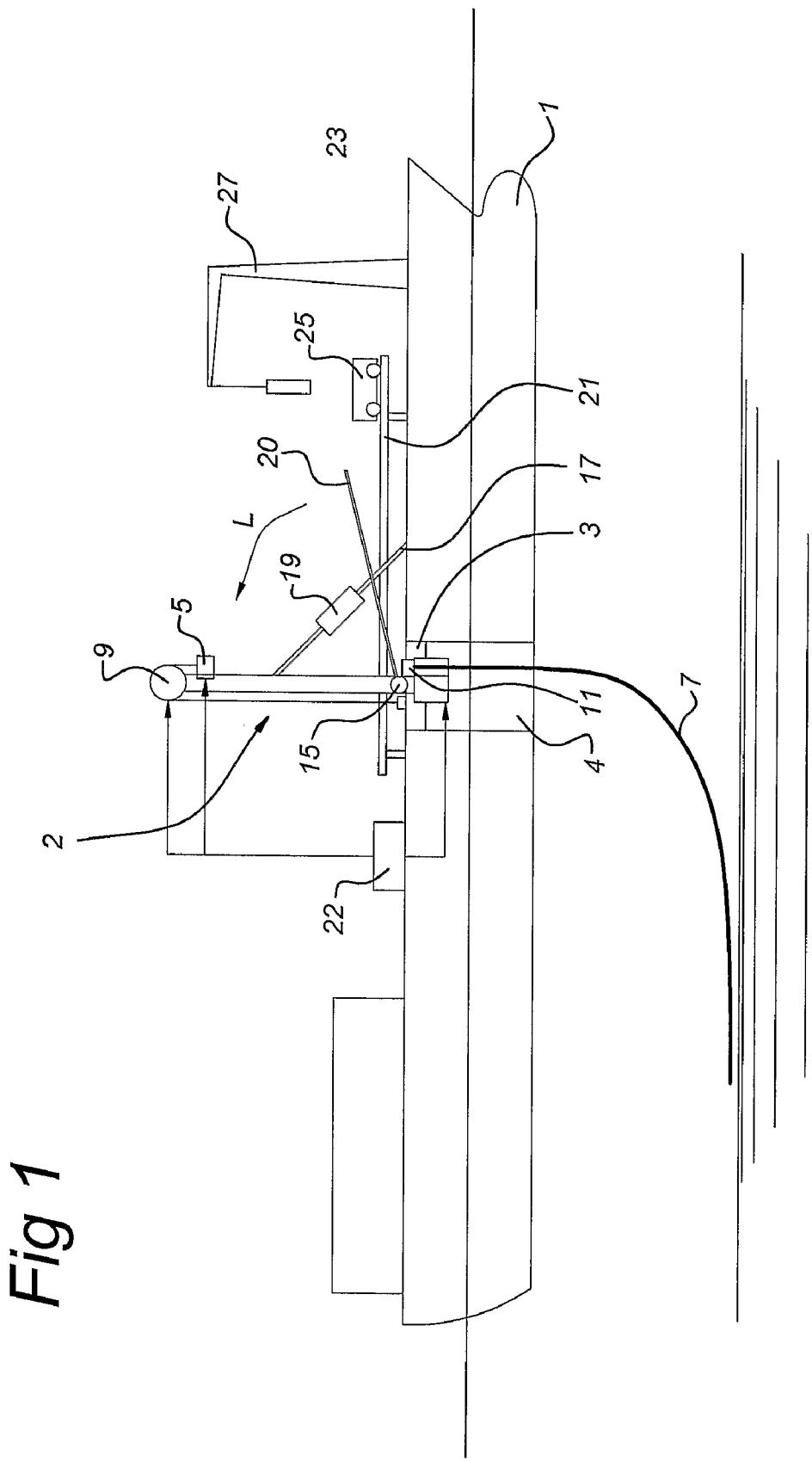
FIG. 1 shows a schematic side view of a vessel according to the present invention.

FIG. 1 shows a pipe-lay vessel 1, which may be dynamically positioned at a deployment site. On the vessel 1 a pipe-lay tower 2 is supported by a vessel support structure 3, for instance a reinforcement structure over a moon pool 4 through the hull of the vessel. The tower 2 comprises an upper clamping element 5 which can travel up and down along the tower 2, for instance via a sheave 9 which is moved in a vertical direction by a hydraulic cylinder. A lower clamping element 11 is supported on the vessel support structure 3, and a sea pipe 7 is suspended from the lower clamping element 11. The tower 2 is hingingly connected to the support structure 3 via a hinge connection 15. The inclination of the tower 2 can be adjusted by extending or contracting struts 17, for instance by operation of drive element 19. A loading arm 20 can pivot around a hinge axis which is parallel to hinge connection 15, from a horizontal position to a vertical position in the direction of the arrow L, for loading a pipe segment into the tower 2. After welding of the pipe segment suspended from the upper clamping member 5 to the sea pipe suspended from the lower clamping element 11, the lower element may be opened and the pipe 7 can be lowered by moving the upper clamping element 5 vertically downwardly. Opening and closing of the upper and lower clamping elements 5, 11 and displacement of the upper clamping member 5 is controlled by a schematically indicated control unit 22.

Supported on the deck of the vessel 2 is a pair of tracks or skid beams 21, which extend from a loading position 23 to the pipe trajectory in the tower 2. A support member 25 can travel along the skid beams 21. In the loading position 23, a crane 27 can position equipment on the support member 25, such as for instance a PLEM, for transport to the pipe trajectory in the tower 2. In addition to the support member 25, a welding station can be placed on the skid beams 21, for welding the equipment that is transported to the pipe trajectory by the transport member, along the skid beams 21, into place.

Figure 2:
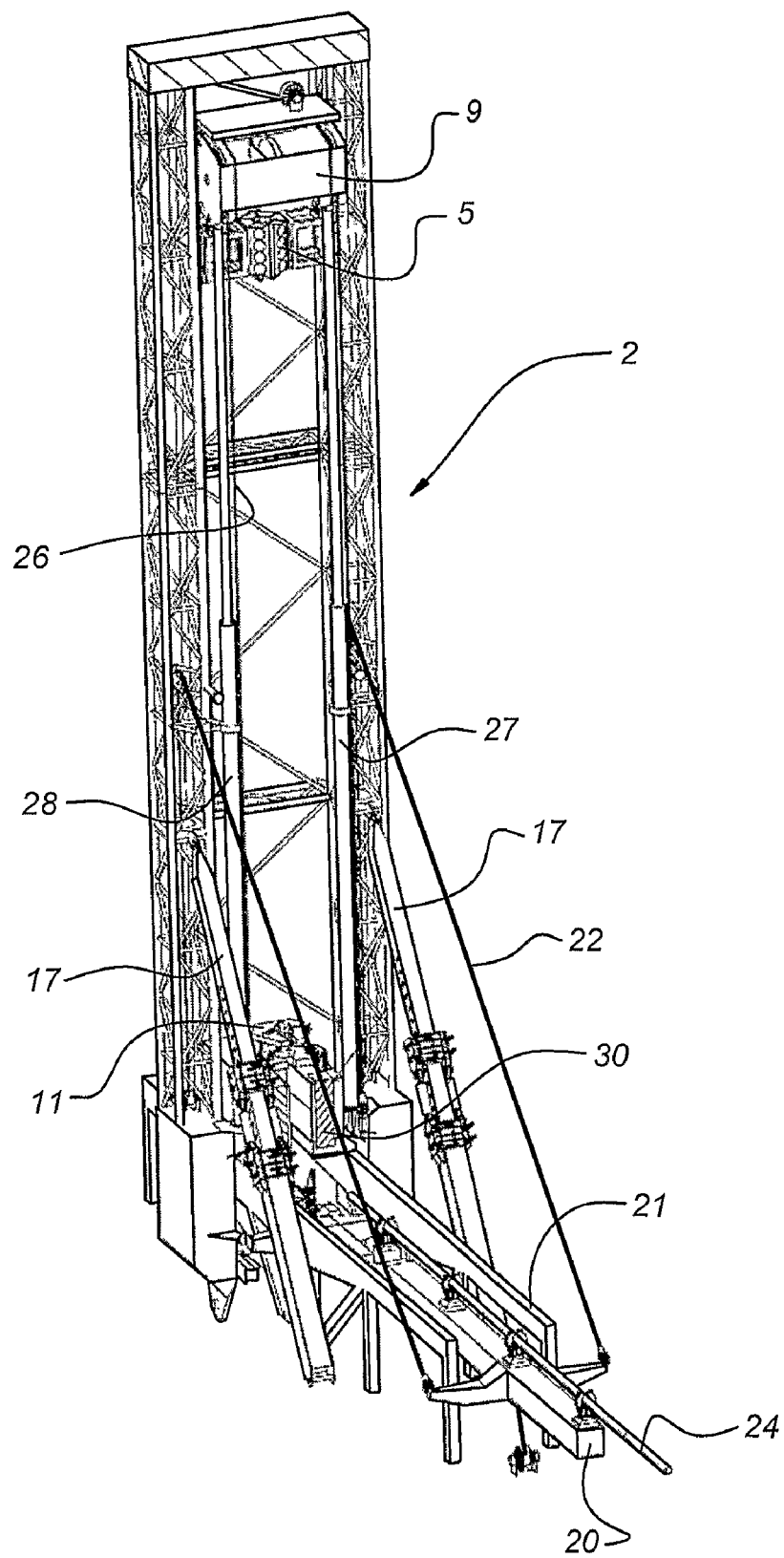
FIG. 2 shows a perspective view of a pipe-lay tower according to the present invention.
Figure 3:
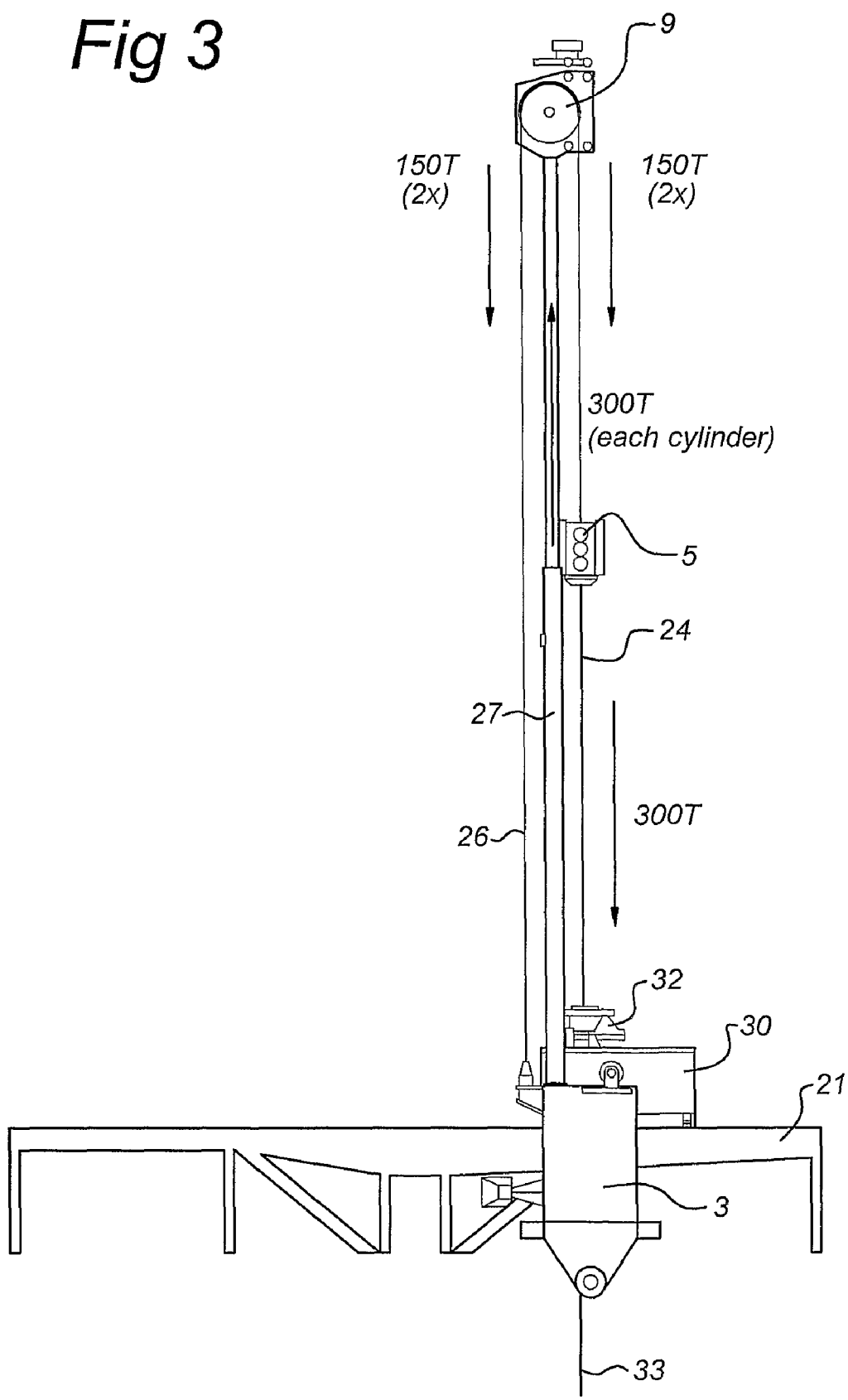
FIG. 3 shows a schematic side view of the hydraulic drive member of the travelling clamp of FIG. 2.

FIG. 2 shows the tower 2 in a perspective view. The upper clamping member 5 is suspended via a cable 26 from the sheaves 9, which are connected to hydraulic cylinders 27,28. The upper clamping member travels up and down by expansion and contraction of the cylinders 27, 28. The lower clamping element 11 is situated below a welding table 30, which is displaceable over the skid beams 21. Between the skid beams 21, the loader arm 20 is situated, which arm can be loaded in the horizontal position with a first pipe segment 24, and which can be placed in a vertically upright position by tensioning the cables 22. After placement in the upright position, the first pipe segment is clamped by upper clamping member 5, and is subsequently released from loader arm 20. After pivoting loading arm 20 back to its horizontal position, the pipe segment 24 can be lowered. As can be seen in FIG. 3, the hydraulic cylinders 27 are supported on the support structure 3 of the vessel, as is the lower clamping element 11, which carries the vertical weight of the piping 7, which may amount to for instance 300T. The end of the cable 26 is also attached to the support structure 3. After welding the pipe segment 24 to the lower sea pipe via the welding table 30, the whole pipe 7 is lowered from the upper clamping element 5.

Figure 4:
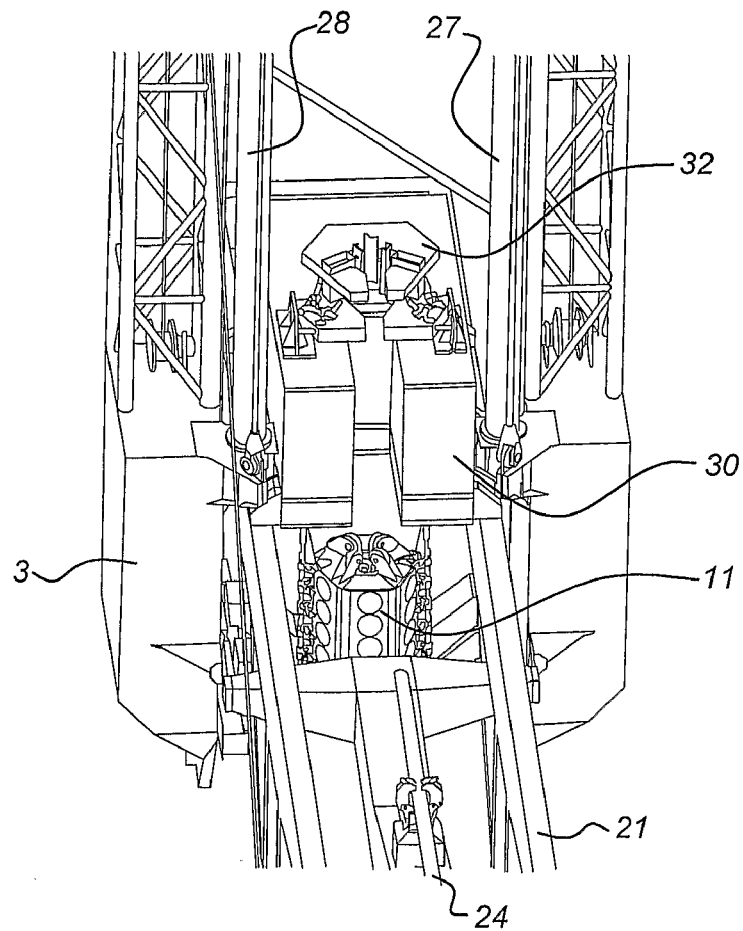
FIG. 4 shows a perspective view of a welding table according to the present invention.
Figure 5:
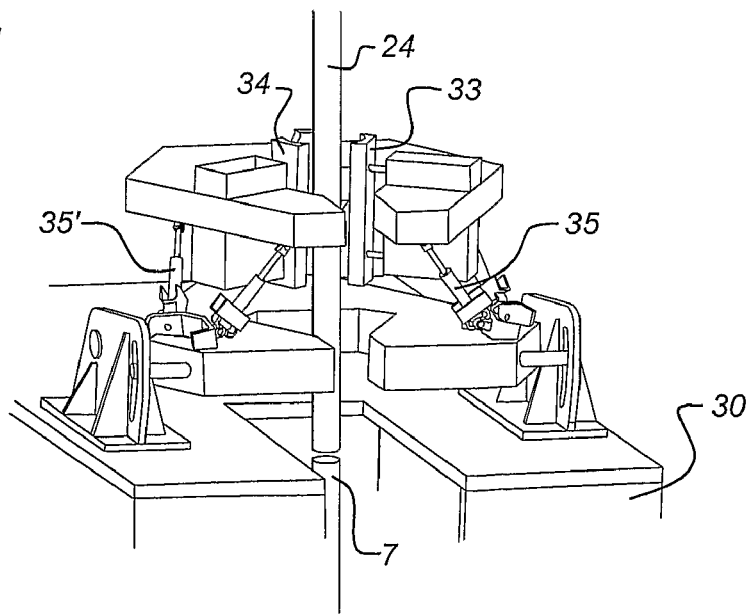
FIG. 5 shows an external line-up tool situated on top of the welding table of FIG. 4, FIGS. 6-9 show the different stages of pipe loading, lowering and return to the start position of a pipe-lay cycle

FIG. 4 shows the welding table 30 in more detail, and an external alignment tool 32 situated on top of welding table 30. FIG. 5 shows the alignment tool 32 in more detail, comprising clamping brackets 33, 34 and hydraulic cylinders 35, 35' for bending of the lower part of pipe segment 24 to be aligned with the upper end of sea pipe 7.

The normal pipe laying cycle is shown in FIGS. 6-9. In the starting position, the sea pipe 7 is suspended from the fixed clamping element 11. The welding table 30 and the external alignment tool 32 on top of the welding table are opened to receive the upper pipe segment 24 in a radial direction.

The upper pipe segment 24 is loaded onto the horizontal loader arm 20 onto which it is attached via clamps 37. The upending winches are actuated and cables 22 are tensioned until the pipe segment 24 is in the pipe trajectory. In axial direction, the pipe segment 24 is approximately 0.5 m above the sea pipe 7.

Figure 7:
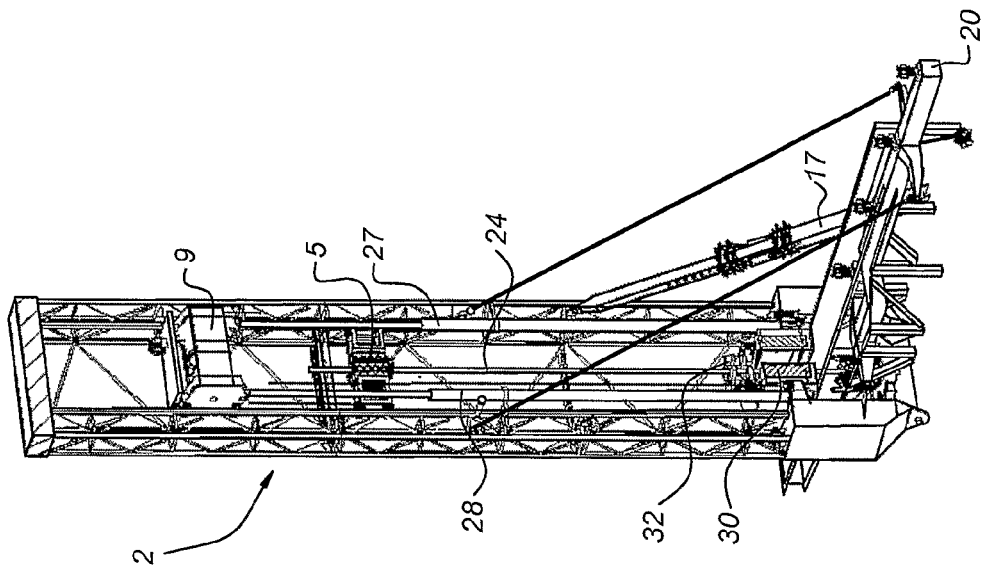
Figure 6:
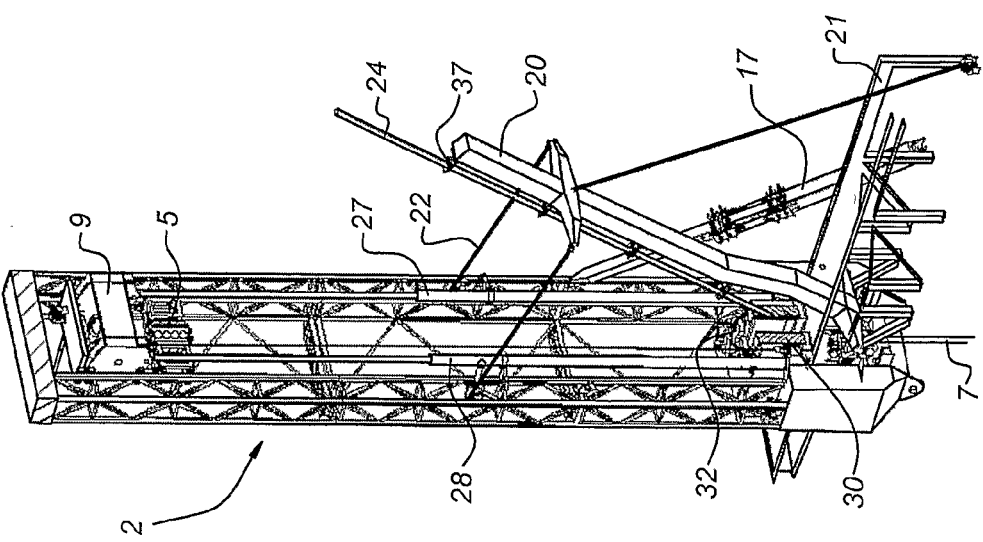

Next, the external line up tool 32 engages the upper pipe segment to control the transverse position of the pipe segment, and the travelling clamping member 5 is lowered over the pipe segment 24 and is actuated, taking over the weight of the pipe segment 24 from the loader arm 20. The loader arm clamps 37 are disengaged and the loader arm 20 can rotate back to its horizontal position. Now the pipe segment is suspended from the travelling clamping member 5, while the lower end is transversely positioned by the line up tool 32, as shown in FIG. 7.

Figure 8:
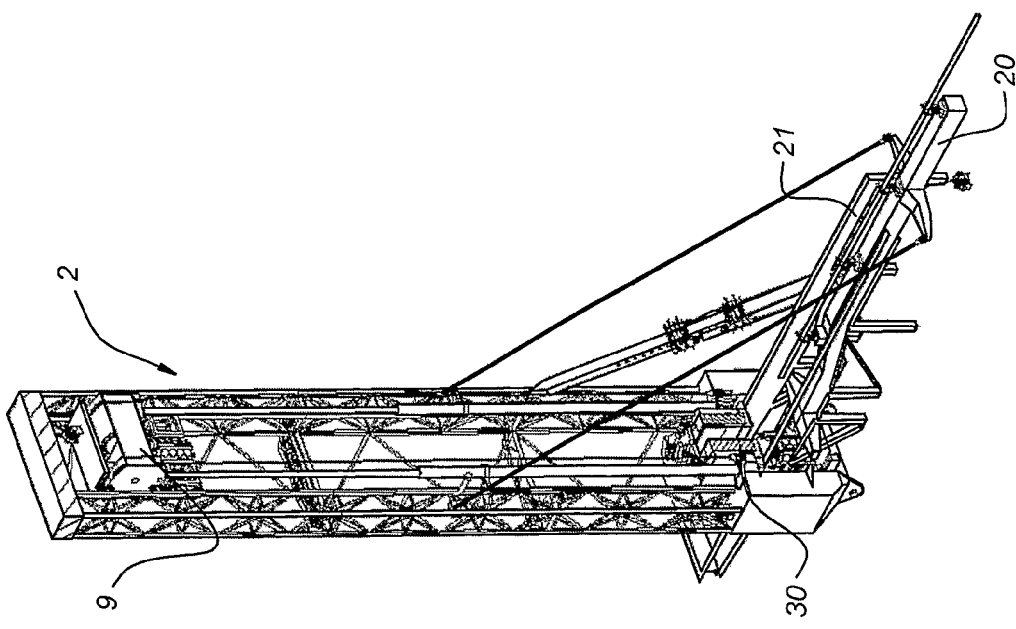

Now the pipe segment 24 is lowered, and the weight is transferred from the clamping member 5 to the alignment tool 32. Next, pre-heating, welding, NDT and coating is performed in the welding station 30 which is closed, as can be seen in FIG. 7. During this process the lower end of pipe segment 24 remains positioned by the line up tool 32 while the sea pipe 7 is still suspended from lower clamping member 11. When the upper segment 24 has been successfully coupled to the sea pipe 7, the alignment tool 32 is opened and the welding station 30 is displaced along the skid beams 21 to the aft, out of the pipe trajectory, as shown in FIG. 8.

Now the upper clamp is closed and pretensioned so to take over the load of the fixed clamp 11. The fixed clamp 11 disengages. The sea pipe 7 is lowered and at the lower point, the fixed clamp 11 is again engaged and the load is transferred from the travelling clamp 5 to the fixed clamp 11.

Figure 9:
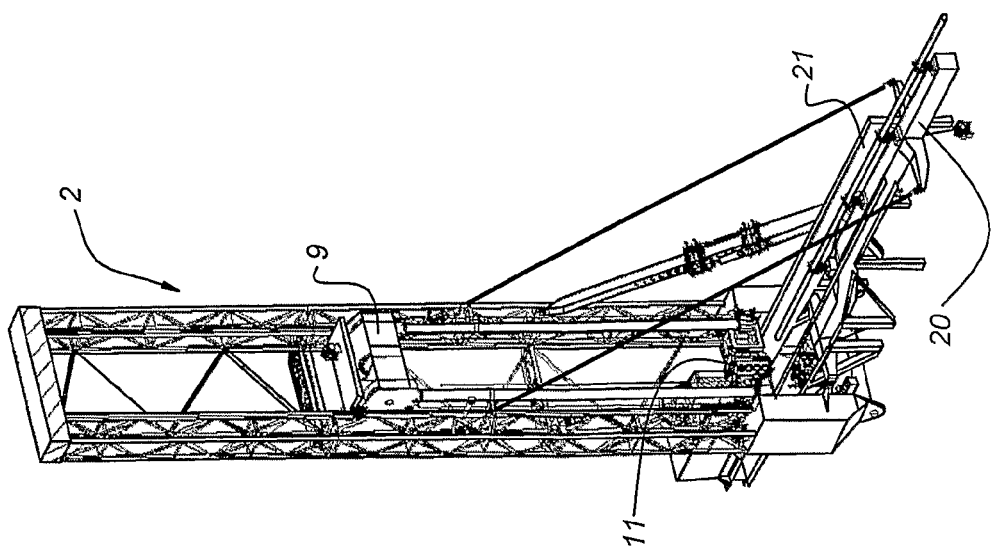

Next, the travelling clamp 5 travels upward, as is shown in FIG. 9 and the welding station 30 is skidded along skid beams 21 back into the pipe trajectory.

Suitable arrangements of cylinders for use in an external line up tool 32 are described in U.S. Pat. No. 6,474,915 and U.S. Pat. No. 5,354,158 which are incorporated herein by reference. Other suitable positioning tables for use as a line up tool 32 are described in U.S. Pat. No. 6,213,686 and U.S. Pat. No. 6,398,457 which are incorporated herein by reference.

Figure 10:
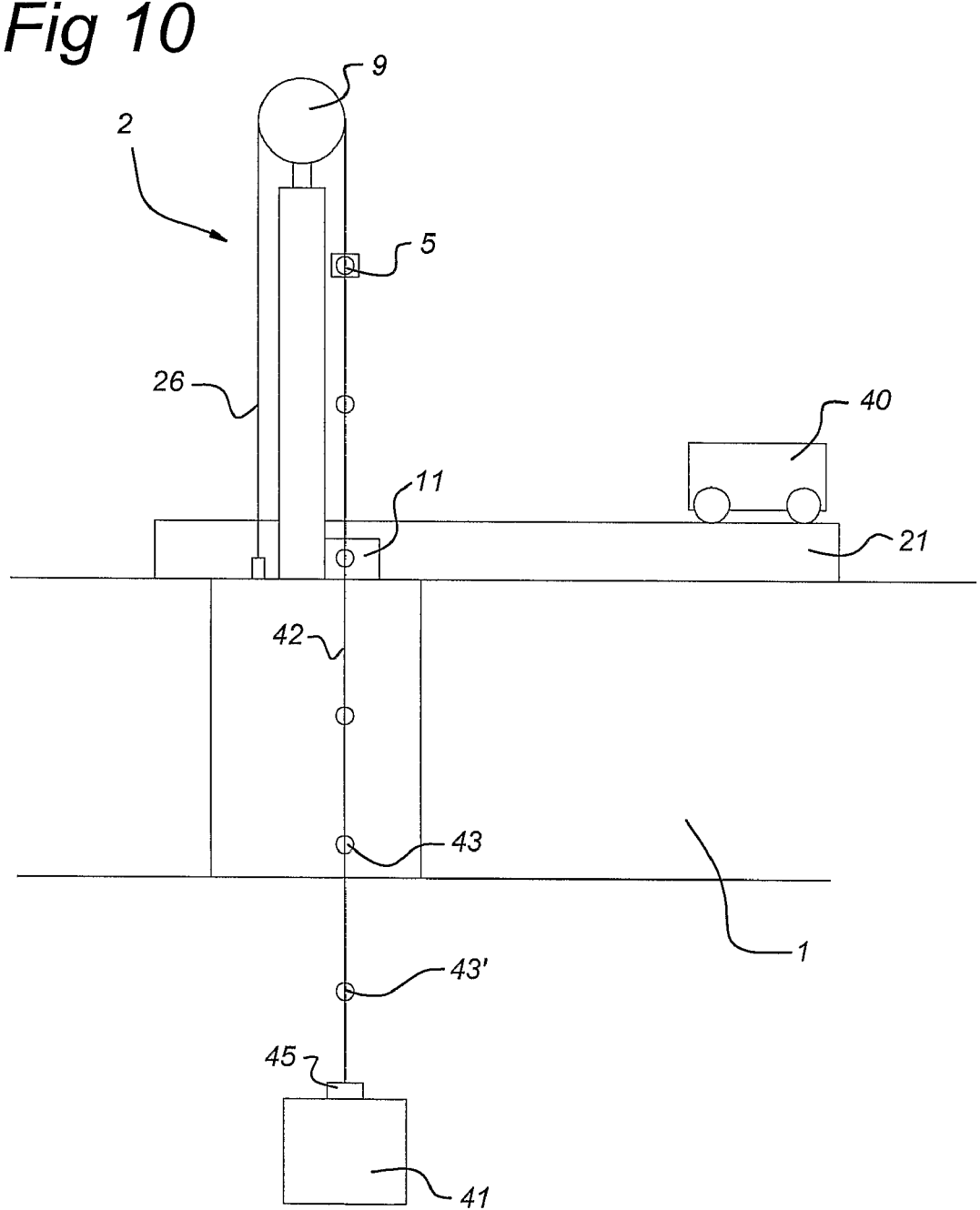
FIG. 10 shows a schematic side view of a lifting system using the pipe-lay tower of the present invention.

In FIG. 10, a cable 42 is shown, comprising at a regular spacing, gripping elements 43, 43' which can engage with the upper and lower clamping elements 5, 11. Via a second support member 40, equipment 41 can be transported to the pipe trajectory, for lowering towards or raising from the sea bed. Instead of attaching coupling member 45 of the cable 42 to equipment, the coupling member 45 of the cable 42 can be connected to the upper end of the sea pipe 7, for use as an abandonment and retrieval means.

The invention claimed is:

1. A vessel comprising: a substantially vertical frame, a vessel support structure supporting said frame, an upper clamping element vertically displaceable along the frame via a displacement member, a lower clamping element supported by the vessel support structure and aligned with the upper clamping element, a loading device comprising an arm that is movable from a substantially horizontal position to a position parallel to the frame for supplying a pipe segment to the upper clamping element, a control unit adapted to control the displacement member and the upper and lower clamping elements for lowering the pipe segment by the displacement member along a pipe trajectory, the upper clamping element being engaged on the pipe segment while the lower clamping element is disengaged, a transverse track extending from a loading position on the vessel to a position alongside the pipe trajectory, and a support member which is displaceable along the track to move a pipe segment into the pipe trajectory.

2. The vessel according to claim 1 wherein the lower clamping element is positioned at a height lower than the support member.

3. The vessel according to claim 2, wherein the frame is connected to the vessel via a hinge axis, and wherein drive means is provided for adjusting the angle of the frame by hinging around the axis, independently from the support member.

4. The vessel according to claim 3, wherein the vessel further comprises: a storage device storing a length of cable, the cable comprising at spaced distances gripping members for engaging with the clamping elements, the cable being guided from the storage device to a guide roller on the frame, and from the guide roller downwardly along the pipe trajectory, a lifting member being attached to the end of the cable.

5. The vessel according to claim 2, wherein the support member further comprises: a generally U-shaped welding table for attaching two pipe segments ends of a first pipe segment hanging from the upper clamping element and a second pipe segment hanging from the lower clamping element, having: two legs on each side of the pipe trajectory, and an upper positioning device on the welding table, having at least two clamping blocks for engaging with a pipe, the upper positioning device being attached to the welding table via at least two force transmitters for causing a displacement of the clamping blocks relative to the welding table.

6. The vessel according to claim 5, wherein a second support element is positioned on the track to be displaceable along the track for receiving a structural element in a receiving position remote from the pipe trajectory, and for placing the structural element in the pipe trajectory.

7. The vessel according to claim 5, wherein the vessel further comprises: a storage device storing a length of cable, the cable comprising at spaced distances gripping members for engaging with the clamping elements, the cable being guided from the storage device to a guide roller on the frame, and from the guide roller downwardly along the pipe trajectory, a lifting member being attached to the end of the cable.

8. The vessel according to claim 2, wherein the vessel further comprises: a storage device storing a length of cable, the cable comprising at spaced distances gripping members for engaging with the clamping elements, the cable being guided from the storage device to a guide roller on the frame, and from the guide roller downwardly along the pipe trajectory, a lifting member being attached to the end of the cable.

9. The vessel according to claim 1, wherein the frame is connected to the vessel via a hinge axis, and wherein drive means is provided for adjusting the angle of the frame by hinging around the axis, independently from the support member.

10. The vessel according to claim 9, wherein the support member further comprises: a generally U-shaped welding table for attaching two pipe segments ends of a first pipe segment hanging from the upper clamping element and a second pipe segment hanging from the lower clamping element, having: two legs on each side of the pipe trajectory, and an upper positioning device on the welding table, having at least two clamping blocks for engaging with a pipe, the upper positioning device being attached to the welding table via at least two force transmitters for causing a displacement of the clamping blocks relative to the welding table.

11. The vessel according to claim 10, wherein a second support element is positioned on the track to be displaceable along the track for receiving a structural element in a receiving position remote from the pipe trajectory, and for placing the structural element in the pipe trajectory.

12. The vessel according to claim 10, wherein the vessel further comprises: a storage device storing a length of cable, the cable comprising at spaced distances gripping members for engaging with the clamping elements, the cable being guided from the storage device to a guide roller on the frame, and from the guide roller downwardly along the pipe trajectory, a lifting member being attached to the end of the cable.

13. The vessel according to claim 9, wherein the vessel further comprises: a storage device storing a length of cable, the cable comprising at spaced distances gripping members for engaging with the clamping elements, the cable being guided from the storage device to a guide roller on the frame, and from the guide roller downwardly along the pipe trajectory, a lifting member being attached to the end of the cable.

14. The vessel according to claim 1, wherein the support member further comprises: a generally U-shaped welding table for attaching two pipe segments ends of a first pipe segment hanging from the upper clamping element and a second pipe segment hanging from the lower clamping element, having: two legs on each side of the pipe trajectory, and an upper positioning device on the welding table, having at least two clamping blocks for engaging with a pipe, the upper positioning device being attached to the welding table via at least two force transmitters for causing a displacement of the clamping blocks relative to the welding table.

15. The vessel according to claim 14, wherein a second support element is positioned on the track to be displaceable along the track for receiving a structural element in a receiving position remote from the pipe trajectory, and for placing the structural element in the pipe trajectory.

16. The vessel according to claim 15, wherein the vessel further comprises: a storage device storing a length of cable, the cable comprising at spaced distances gripping members for engaging with the clamping elements, the cable being guided from the storage device to a guide roller on the frame, and from the guide roller downwardly along the pipe trajectory, a lifting member being attached to the end of the cable.

17. The vessel according to claim 14, wherein the vessel further comprises: a storage device storing a length of cable, the cable comprising at spaced distances gripping members for engaging with the clamping elements, the cable being guided from the storage device to a guide roller on the frame, and from the guide roller downwardly along the pipe trajectory, a lifting member being attached to the end of the cable.

18. The vessel according to claim 1, wherein the vessel further comprises: a storage device storing a length of cable, the cable comprising at spaced distances gripping members for engaging with the clamping elements, the cable being guided from the storage device to a guide roller on the frame, and from the guide roller downwardly along the pipe trajectory, a lifting member being attached to the end of the cable.

* * * * *